United States Patent
Suzuki et al.

(10) Patent No.: US 10,906,282 B2
(45) Date of Patent: Feb. 2, 2021

(54) CARD-USE RESIN COMPOSITION HAVING LASER-MARKING COLORING PROPERTIES AND CARD MADE THEREWITH

(71) Applicants: MITSUBISHI GAS CHEMICAL COMPANY, INC., Tokyo (JP); MGC FILSHEET CO., LTD., Saitama (JP)

(72) Inventors: Kentaro Suzuki, Tokyo (JP); Masahide Takeda, Tokyo (JP); Satoshi Kaneko, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 16/620,122

(22) PCT Filed: Jun. 12, 2018

(86) PCT No.: PCT/JP2018/022439
§ 371 (c)(1),
(2) Date: Dec. 6, 2019

(87) PCT Pub. No.: WO2018/235677
PCT Pub. Date: Dec. 27, 2018

(65) Prior Publication Data
US 2020/0207067 A1    Jul. 2, 2020

(30) Foreign Application Priority Data

Jun. 19, 2017    (JP) ................................ 2017-119921

(51) Int. Cl.
| | | |
|---|---|---|
| *B32B 27/36* | (2006.01) | |
| *B41M 5/26* | (2006.01) | |
| *B42D 25/41* | (2014.01) | |
| *B42D 25/45* | (2014.01) | |

(52) U.S. Cl.
CPC .......... *B32B 27/365* (2013.01); *B41M 5/267* (2013.01); *B42D 25/41* (2014.10); *B42D 25/45* (2014.10); *B32B 2250/03* (2013.01); *B32B 2250/05* (2013.01); *B32B 2250/40* (2013.01); *B32B 2307/412* (2013.01); *B32B 2313/04* (2013.01); *B32B 2369/00* (2013.01); *B32B 2425/00* (2013.01)

(58) Field of Classification Search
CPC ........ B32B 27/365; B32B 27/36; B41M 5/26; B42D 25/41; B42D 25/45
USPC ........................................................ 524/496
See application file for complete search history.

(56) References Cited

U.S. PATENT DOCUMENTS

| | | | |
|---|---|---|---|
| 2008/0050663 A1* | 2/2008 | Kawakami | ............... B32B 27/18 430/14 |
| 2011/0076452 A1 | 3/2011 | Sakagami et al. | |
| 2011/0123766 A1 | 5/2011 | Sakagami et al. | |
| 2011/0156382 A1 | 6/2011 | Uyttendaele | |
| 2012/0001413 A1 | 1/2012 | Pudleiner et al. | |
| 2012/0164419 A1* | 6/2012 | Sakagami | ............... B32B 27/12 428/216 |
| 2014/0232810 A1 | 8/2014 | Waumans et al. | |
| 2019/0256706 A1 | 8/2019 | Takeda et al. | |

FOREIGN PATENT DOCUMENTS

| | | |
|---|---|---|
| EP | 2 281 685 | 2/2011 |
| EP | 3 075 559 | 10/2016 |
| JP | 2012-516790 | 7/2012 |
| WO | 2009/037993 | 3/2009 |
| WO | 2015/079541 | 6/2015 |
| WO | 2018/074480 | 4/2018 |
| WO | 2018/074482 | 4/2018 |

OTHER PUBLICATIONS

Extended European Search Report, European Patent Office, Application No. 18821019.9, dated Apr. 6, 2020.
International Search Report issued in International Patent Application No. PCT/JP2018/022439, dated Aug. 21, 2018 with English Translation.
International Preliminary Report on Patentability issued in International Patent Application No. PCT/JP2018/022439, dated Dec. 24, 2019 with English Translation.

* cited by examiner

*Primary Examiner* — Deve V Hall
(74) *Attorney, Agent, or Firm* — Greenblum & Bernstein, P.L.C.

(57) ABSTRACT

The present invention realizes a card-use resin composition that exhibits beautiful colors and that has high laser-marking coloring properties, a card-use resin sheet formed with the card-use resin composition, and a card. The above problem has been solved by a card-use resin composition containing a laser coloring agent and a thermoplastic resin, wherein the thermoplastic resin contains a polycarbonate resin, and the laser coloring agent contains at least one type of black pigment, the primary particle diameter of the black pigment being 40 to 80 nm, and the amount of the black pigment with respect to the entire mass of the card-use resin composition being 20 to 40 mass ppm.

7 Claims, 5 Drawing Sheets

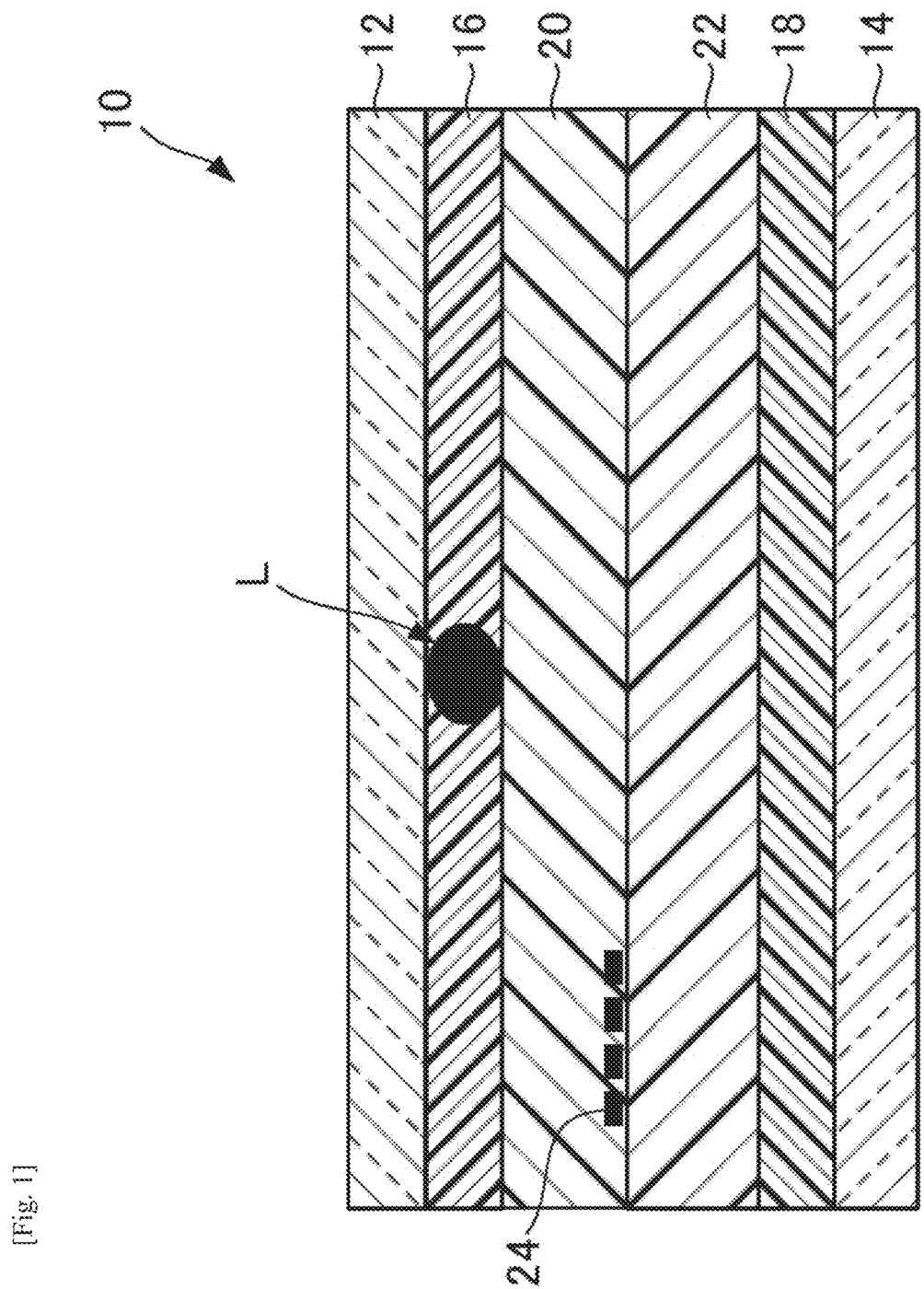
[Fig. 1]

[Fig. 2]
(A)
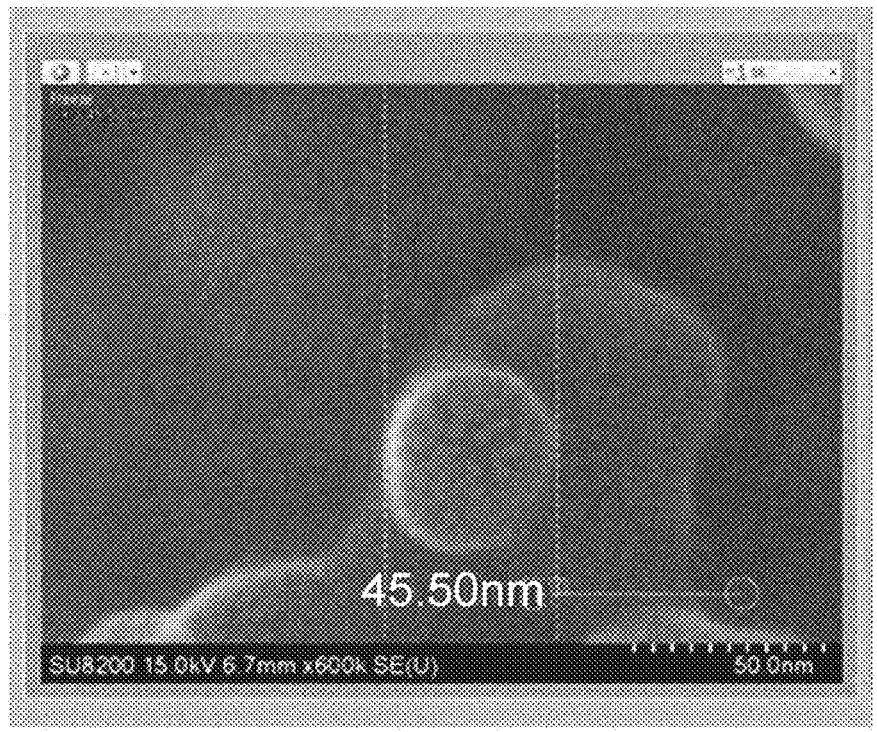
(B)
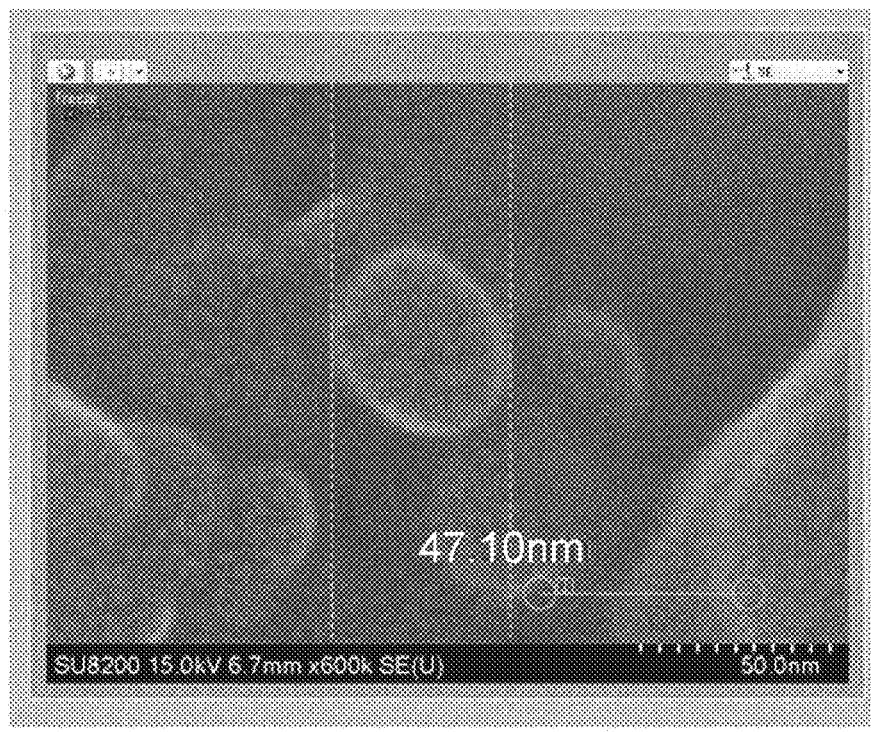

[Fig. 3]
(A)
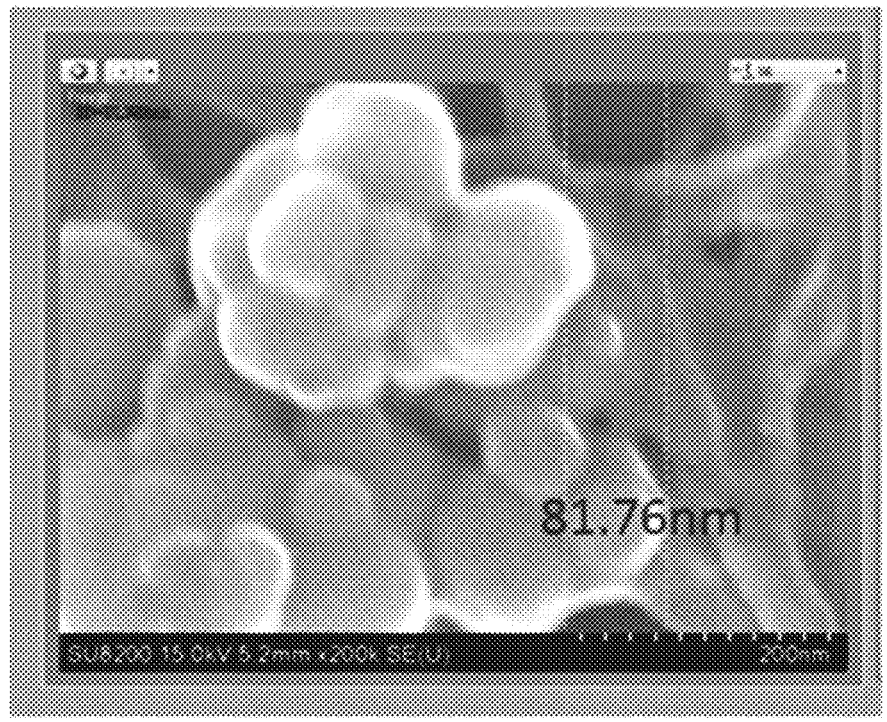
(B)
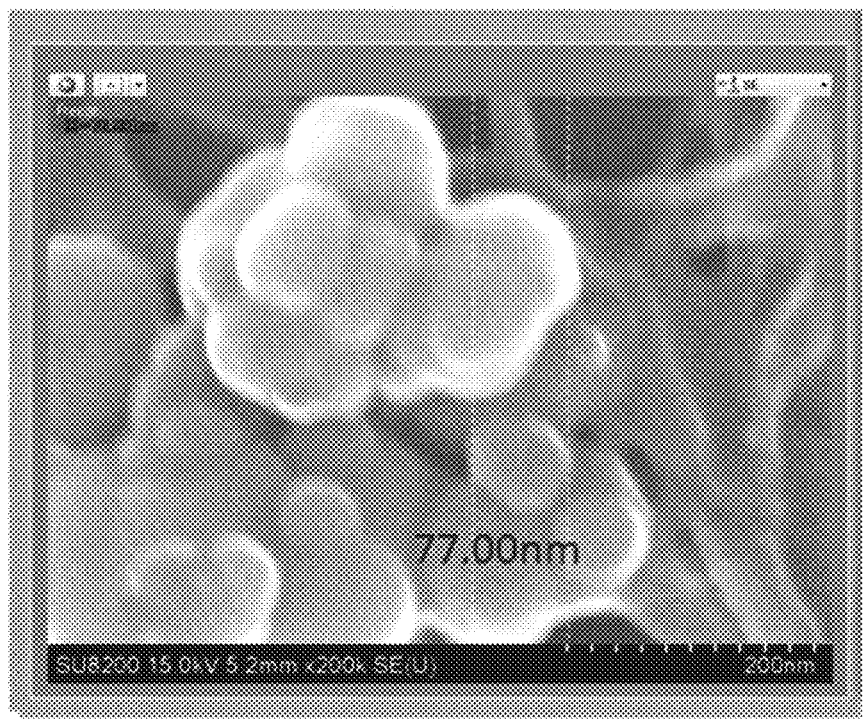

[Fig. 4]
(A)
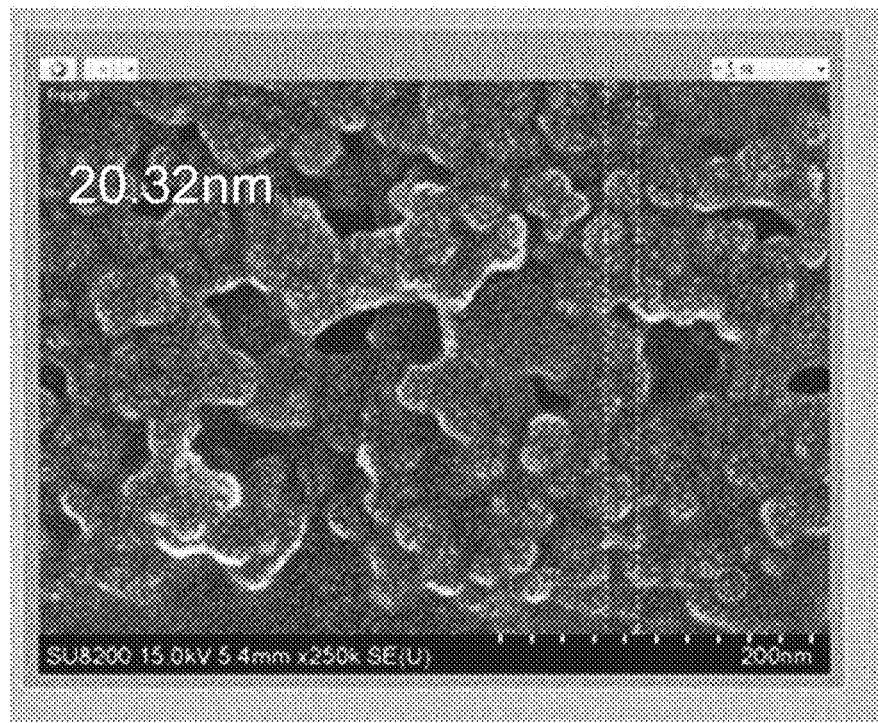
(B)
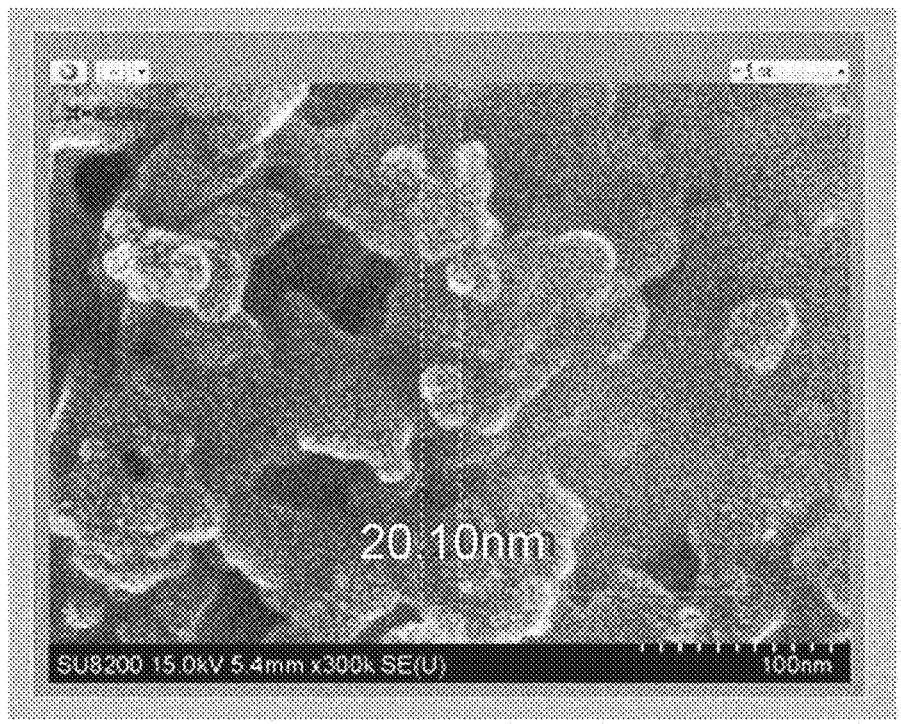

[Fig. 5]
(A)
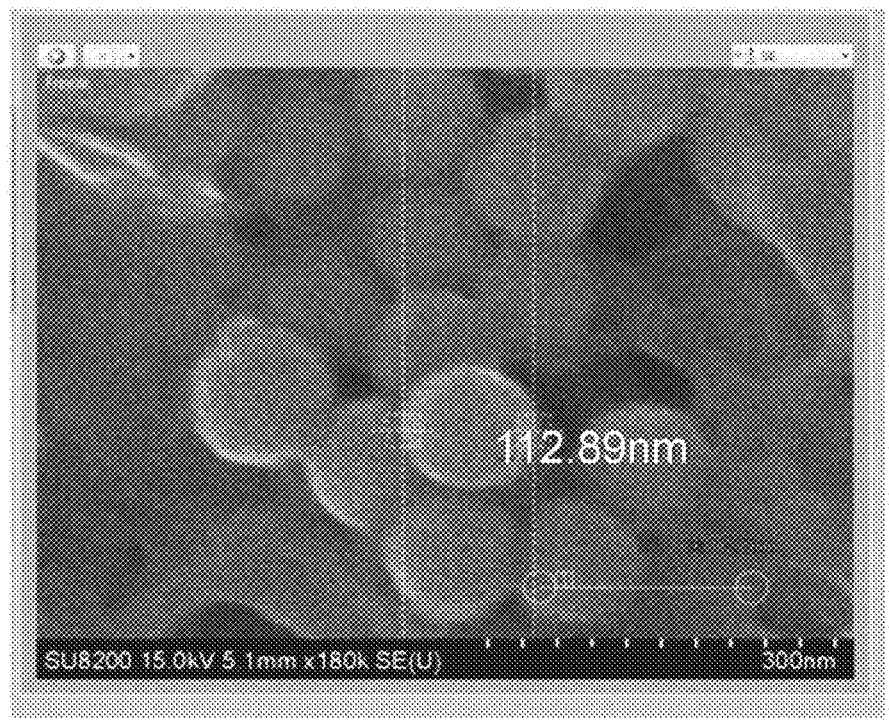
(B)
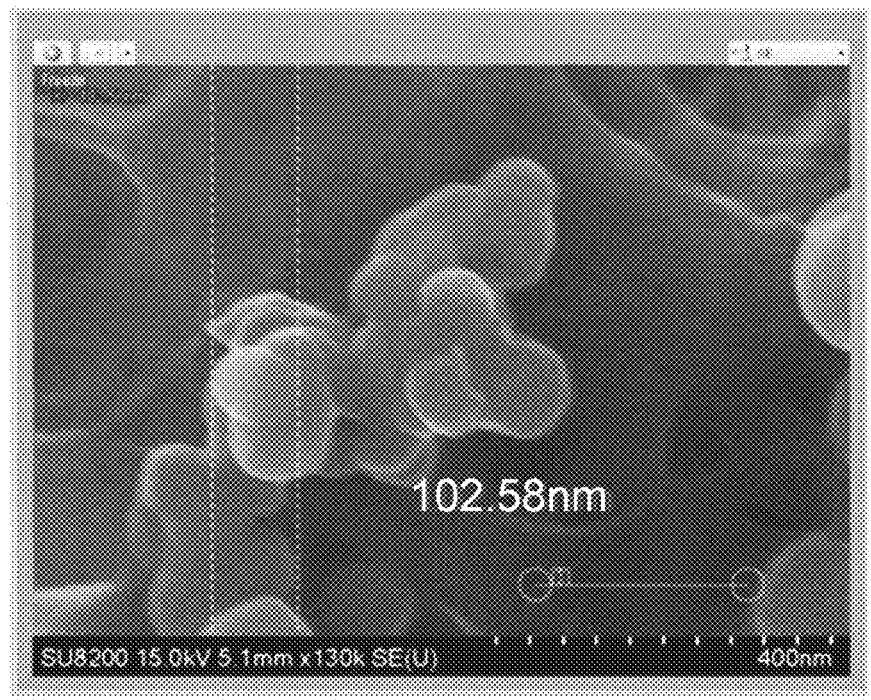

CARD-USE RESIN COMPOSITION HAVING LASER-MARKING COLORING PROPERTIES AND CARD MADE THEREWITH

TECHNICAL FIELD

The present invention relates to a resin composition for cards that exhibits beautiful colors and has high laser-marking coloring properties, wherein only an area irradiated with a laser light is selectively colored, a resin sheet for cards produced by using the same, and a card comprising the resin sheet for cards.

BACKGROUND ART

Resin films are conventionally used for ID cards, e-passports, contactless IC cards, etc. As such a resin film, a film or sheet for laser marking, wherein printing can be provided to a specific area by means of irradiation of a laser light, is known (see Patent Document 1).

PRIOR ART DOCUMENTS

Patent Documents

Patent Document 1: Japanese National-phase PCT Laid-Open Patent Publication No. 2012-516790

DISCLOSURE OF THE INVENTION

Problems to be Solved by the Invention

It cannot be necessarily said that conventional films or sheets for laser marking have good color tones, and there are problems, for example, brightness is insufficient, only a specific hue such as yellow is strong, and the surface appears to be slightly colored.

Means for Solving the Problems

The present inventors diligently made researches in order to solve the above-described problem and found that excellent color tones and high laser-marking coloring properties can be realized by a resin composition which contains a thermoplastic resin containing a polycarbonate resin and a black pigment having a predetermined primary particle diameter, and thus the present invention was achieved.

Specifically, the present invention relates to a resin composition for cards, a resin sheet for cards formed by using the resin composition for cards and a card having the resin sheet for cards described below.

(1) A resin composition for cards containing a laser coloring agent and a thermoplastic resin, wherein:

the thermoplastic resin contains a polycarbonate resin; and the laser coloring agent contains at least one type of black pigment, the primary particle diameter of the black pigment being 40 to 80 nm, and the amount of the black pigment being 20 to 40 mass ppm based on the mass of the whole resin composition for cards.

(2) The resin composition for cards according to item (1), wherein when the light transmittance of the resin composition for cards with a thickness of 1 mm at a wavelength of 1064 nm is referred to as T % and the light reflectance of the resin composition for cards with a thickness of 1 mm at a wavelength of 1064 nm is referred to as R %, the value of the light absorption rate A % at a wavelength of 1064 nm defined by formula (a) below is 10% or more:

$$100-(T(\%)+R(\%))=A(\%) \tag{a}$$

(3) A resin sheet for cards containing the resin composition for cards according to item (1) or (2).

(4) The resin sheet for cards according to item (3), wherein: the value of the color tone difference $\Delta L^*$ defined by formula (I) below is 10 or less; the value of the color tone difference $\Delta a^*$ defined by formula (II) below is 1 or less; and the value of the color tone difference $\Delta b^*$ defined by formula (III) below is 1 or less $$\Delta L^* = |L^*_{Ref} - L^*| \tag{I}$$

$$\Delta a^* = |a^*_{Ref} - a^*| \tag{II}$$

$$\Delta b^* = |b^*_{Ref} - b^*| \tag{II}$$

wherein color tone values ($L^*$, $a^*$, $b^*$) in formulae (I), (II) and (III) above show color tones of reflected colors obtained when light is incident on a transparent resin sheet side of a first laminate in which a transparent resin sheet is layered on one surface of the resin sheet for cards and a white resin sheet is layered on the other surface thereof, and wherein color tone values ($L^*_{Ref}$, $a^*_{Ref}$, $b^*_{Ref}$) in formulae (I), (II) and (III) above show color tones of reflected colors obtained when light is incident on a transparent resin sheet side of a second laminate in which the transparent resin sheet and the white resin sheet are layered and the layer of the resin sheet for cards is not included.

(5) The resin sheet for cards according to item (3) or (4), wherein the OD value in accordance with ISO 5-4 is 1.55 or more.

(6) The resin sheet for cards according to any one of items (3) to (5), which has a thickness of 20 to 120 μm.

(7) A security card or ID card which comprises the resin sheet for cards according to any one of items (3) to (6).

Advantageous Effect of the Invention

The resin composition for cards of the present invention contains both a black pigment having a predetermined primary particle diameter as a laser coloring agent (e.g., carbon black) and a thermoplastic resin containing a polycarbonate resin as described above, and for this reason, the composition has excellent color tones (e.g., L value and b value) and laser marking properties (color developing properties). Further, the resin sheet for cards of the present invention contains the above-described resin composition for cards and is suitably used as various sheet-like members, in particular, as cards, etc., and is suitably used, for example, as a security card, an ID card, an e-passport, a contactless IC card, etc.

BRIEF DESCRIPTION OF THE DRAWINGS

FIG. 1 is a cross sectional view showing a specific example of an ID card.

FIG. 2 is an SEM image (image obtained by means of a scanning electron microscope) showing magnified carbon black collected on a filter, which was obtained by dissolving the resin sheet for cards of Example 3 in dichloromethane and filtering the mixture with the filter.

FIG. 3 is an SEM image showing magnified carbon black collected on a filter, which was obtained by dissolving the resin sheet for cards of Example 4 in dichloromethane and filtering the mixture with the filter.

FIG. 4 is an SEM image (image obtained by means of a scanning electron microscope) showing magnified carbon black collected on a filter, which was obtained by dissolving the resin sheet for cards of Comparative Example 12 in dichloromethane and filtering the mixture with the filter.

FIG. 5 is an SEM image showing magnified carbon black collected on a filter, which was obtained by dissolving the resin sheet for cards of Comparative Example 19 in dichloromethane and filtering the mixture with the filter.

BEST MODE FOR CARRYING OUT THE INVENTION

Hereinafter, the present invention will be described in detail. Note that the present invention is not limited to the below-described embodiments, and can be arbitrarily changed and then carried out within a range in which the effects of the present invention are exerted.

[Resin Composition for Cards]

The resin composition for cards of the present invention is suitably used for the production of cards, and in particular, it is suitably used as a material of a film or sheet for laser marking (laser marking layer), wherein printing can be provided by means of irradiation of a laser light, which is included in a security card, an ID card or the like. The resin composition for cards contains at least a thermoplastic resin and a laser coloring agent.

[Thermoplastic Resin]

The thermoplastic resin to be used in the resin composition for cards of the present invention contains a polycarbonate resin.

<Polycarbonate Resin>

The polycarbonate resin contained in the thermoplastic resin is not particularly limited as long as it contains a carbonate bond in the main chain of the molecule, i.e., it contains a —[O—R—OCO]— unit (R includes an aliphatic group, an aromatic group, or both of the aliphatic group and the aromatic group, and further has a linear structure or a branched structure), but an aromatic polycarbonate resin is preferably used.

The weight-average molecular weight of the polycarbonate resin is preferably 20,000 to 80,000, more preferably 30,000 to 70,000, and even more preferably 40,000 to 60,000.

Further, the glass transition temperature of the polycarbonate resin is preferably 120 to 160° C., and more preferably 130 to 155° C.

In the thermoplastic resin, the ratio between the polycarbonate resin and other resins can be suitably adjusted, but the thermoplastic resin contains the polycarbonate resin in an amount of preferably 50% or more, more preferably 60% or more, and particularly preferably 80% or more of the whole thermoplastic resin.

<Resin Component Other than Polycarbonate>

The type of a resin other than the polycarbonate resin contained in the thermoplastic resin is not particularly limited, but for example, a polyester resin can be used. Examples of the polyester resin include PETG resin and PCTG resin. The PETG resin is a polyester copolymer consisting of a dicarboxylic acid unit mainly composed of a terephthalic acid unit, an ethylene glycol unit and a glycol unit mainly composed of a 1,4-cyclohexanedimethanol unit. For example, the terephthalic acid unit accounts for 100% of all the dicarboxylic acid units on a molar basis, and the 1,4-cyclohexanedimethanol unit accounts for less than 50% of all the glycol units on a molar basis.

Further, the PCTG resin is a polyester copolymer in which a diol component of polycyclohexanedimethylene terephthalate is partially substituted with ethylene glycol.

<Additives for Thermoplastic Resin>

The thermoplastic resin may contain the below-described additives in addition to the above-described components. Specifically, they are at least one additive selected from the group consisting of an antioxidant, a thermal stabilizer, a flame retardant, a flame retardant auxiliary agent, an ultraviolet absorber, a mold release agent and a coloring agent, etc.

Moreover, an antistatic agent, a fluorescent brightener, an antifog additive, a flowability improving agent, a plasticizer, a dispersant, an antimicrobial agent, etc. may also be added as long as desired physical properties are not significantly impaired.

The content of additives in the thermoplastic resin is, for example, 1.0% by weight or less, preferably 0.5% by weight or less, and more preferably 0.1% by weight or less based on the weight of the whole thermoplastic resin.

[Laser Coloring Agent]

Since the resin composition for cards of the present invention contains a laser coloring agent, it is possible to provide printing by means of marking treatment in which a laser light is irradiated. Since the laser coloring agent is contained in the resin composition for cards, it is suitably used, for example, as a material for cards requiring prevention of falsification particularly. As the laser coloring agent, at least a black pigment is used, and other than that, antimony-doped tin oxide, a bismuth oxide-based coloring agent or the like is used.

The content of the laser coloring agent in the resin composition for cards is preferably 20 to 40 mass ppm (0.0002 to 0.0004% by mass) based on the mass of the whole resin composition for cards. Thus, the upper limit of the content of the laser coloring agent in the resin composition for cards is preferably 40 mass ppm (0.0004% by mass) or less or less than 40 mass ppm, more preferably 38 mass ppm or less, and particularly preferably 35 mass ppm or less. Further, the lower limit of the content of the laser coloring agent in the resin composition for cards is more preferably 22 mass ppm or more, and particularly preferably 25 mass ppm or more.

By adjusting the content of the laser coloring agent within the above-described range, laser marking properties (color developing properties) can be effectively improved without using an unnecessarily large amount of the laser coloring agent.

<Black Pigment>

As the black pigment as the laser coloring agent to be contained in the resin composition for cards, carbon black (hereinafter sometimes abbreviated as "CB"), carbon nanotube, etc. are used, and carbon black is preferably used. The black pigment including carbon black can realize good color developing properties with a small addition amount thereof as described in detail later. Further, by using, as the laser coloring agent, the black pigment such as carbon black, which is recognized as having the effect of improving color developing properties with a small addition amount thereof, for example, ppm level of an addition amount, reduction in physical properties of the whole resin composition associated with increase of the addition amount, can be prevented. For example, reduction in mechanical physical properties, deterioration of transparency (increase of haze value), etc. can be prevented. As the laser coloring agent, the black pigment such as carbon black having the above-described characteristics is superior to inorganic pigments such as metal oxides containing a metal.

In the resin composition for cards, the black pigment is present in an amount of 20 to 40 mass ppm (0.0002 to 0.0004% by mass) based on the mass of the whole resin composition for cards. Thus, the upper limit of the content of the black pigment in the resin composition for cards is 40 mass ppm (0.0004% by mass) or less or less than 40 mass ppm, preferably 38 mass ppm or less, and more preferably 35 mass ppm or less. Further, the lower limit of the content of the black pigment in the resin composition for cards is more preferably 22 mass ppm or more, and particularly preferably 25 mass ppm or more.

The black pigment to be used in the resin composition for cards has a primary particle diameter of 40 to 80 nm. The lower limit of the primary particle diameter of the black pigment is preferably 45 nm, and more preferably 50 nm. Further, the upper limit of the primary particle diameter of the black pigment is preferably 75 nm, and more preferably 70 nm. The resin composition for cards containing the black pigment having a primary particle diameter within the above-described predetermined range has high laser marking properties and exhibits beautiful colors. As described in detail later, this was confirmed by the matter that the primary particle diameter of the black pigment is an important factor, and by the fact that results in which laser marking properties and color tones were improved by adjusting the primary particle diameter within the above-described range were shown.

<Definition of Primary Particle Diameter of Black Pigment>

In this specification, the primary particle diameter of the black pigment contained in the resin sheet (resin composition for cards) is defined as a value obtained by calculation according to the below-described method.

Firstly, the resin sheet containing the black pigment is dissolved in dichloromethane to prepare a solution which was diluted to have a concentration of 10 wt %, it is filtered using a syringe filter (pore size: 100 nm) manufactured by GE Healthcare, and the black pigment is collected on the filter. Next, the collected black pigment is photographed using a scanning electron microscope (SEM) (10000× to 500000×). Regarding each of all particles of the black pigment present in a predetermined area of the photographed image, the particle diameter thereof is measured. The photographed particles include a primary particle which is a single particle and a secondary particle which is an aggregate consisting of at least two particles. Regarding the primary particle diameter of the black pigment, the diameter of each independent particle is measured, and regarding the secondary particle in which particles are aggregated, the diameter of a primary particle whose external form can be observed is measured. Regarding the particles of the collected black pigment, there is variation in particle distribution. For this reason, the above-described measurement is performed with respect to 5 different imaging areas (5 images), the number-average diameter thereof is obtained, and this is regarded as the primary particle diameter.

Thus, the primary particle diameter of the black pigment is an average value of particle diameters of respective single particles of the black pigment. When the black pigment contained in the sheet is aggregated, a secondary particle diameter may be measured as a particle diameter of an aggregate larger than the respective single particles, but it was confirmed that even in an aggregate of the black pigment contained in the resin composition for cards formed into a card, the external form of each particle of the black pigment is almost maintained (see FIGS. 2-4). Accordingly, it can be said that the primary particle diameter of the black pigment is almost maintained even if an aggregate is formed, and it was confirmed that the primary particle diameter is an important factor with respect to characteristics, in particular, laser marking properties and color tones of the resin composition for cards.

The carbon black to be used as the black pigment has an iodine absorption amount (ASTM D-1510) of preferably 20 to 60 (mg/g), and more preferably 25 to 50 (mg/g). The carbon black has an oil absorption amount (ASTM D-2414) of preferably 40 to 160 (cc/100 g), and more preferably 50 to 140 (cc/100 g). Further, the carbon black has a relative tinting strength (ASTM D-3265) of preferably 40 to 80(%), more preferably 45 to 70(%), and even more preferably 50 to 63(%).

<Light Absorption Rate of Resin Composition for Cards>

Regarding the resin composition for cards, the value of the light absorption rate A (%) at a wavelength of 1064 nm calculated according to the above-described formula (a), i.e., the value of the absorption rate A calculated according to the formula below:

$$100-(\text{transmittance } T(\%)+\text{reflectance } R(\%))=\text{absorption rate } A(\%)$$

is preferably 10% or more. The value of the absorption rate A is more preferably 12% or more, even more preferably 14% or more, and particularly preferably 15% or more.

The resin composition for cards in which the value of the absorption rate relative to a light at a wavelength of about 1064 nm is high as described above improves color developing properties. The value of the absorption rate A (%) of the resin composition for cards can be increased by adjusting the content of the black pigment contained in the resin composition for cards to a certain level or higher.

[Resin Sheet for Cards]

The resin composition for cards of the present invention is suitably used as a material of a resin sheet for cards as described above. Specifically, by using the resin composition of the present invention, a resin sheet for cards, for example, a laser marking sheet can be produced.

In the production of a sheet using the resin composition for cards of the present invention, as a method for processing the resin composition to form a layer shape (sheet shape), a conventional technique can be employed. Examples thereof include methods using extrusion molding or cast molding.

For example, in a method using extrusion molding, the resin composition of the present invention in the form of pellet, flake or powder is melted and kneaded by an extruder and then extruded from a T-die or the like, and a sheet in a semi-melted state obtained is cooled and solidified while being compressed by rolls, thereby forming a sheet.

Further, by layering the resin sheet for cards and another layer to be subjected to co-extrusion molding, a card as a laminate, which will be described in detail later, can be produced with a simple process. Thus, by using extrusion molding, a card as a laminate can be produced more efficiently when compared to a production method in which an adhesive layer is formed using an adhesive to carry out lamination, a production method in which a coating film layer is formed using a coating material, etc.

The resin sheet for cards produced in this way, for example, a laser marking sheet (film or sheet for laser marking, or laser marking layer) is excellent in color tones and laser marking properties (color developing properties).

The color tone of the resin sheet for cards was evaluated as described below.

Firstly, values of formulae (I) to (III) below were calculated as color tone differences based on reflected colors (L*a*b*) of a laminate sample (the first laminate) and a reference laminate sample (the second laminate) measured according to the method which will be described in detail later.

All the values of (L*, a*, b*) and ($L^*_{Ref}$, $a^*_{Ref}$, $b^*_{Ref}$) in formulae (I) to (III) are values in the L*a*b* color specification system defined in JIS Z 8781.

$$\Delta L^* = |L^*_{Ref} - L^*| \quad (I)$$

$$\Delta a^* = |a^*_{Ref} - a^*| \quad (II)$$

$$\Delta b^* = |b^*_{Ref} - b^*| \quad (III)$$

From the viewpoint of the color tone of the resin sheet, the values of ΔL*, Δa* and Δb* calculated according to formulae (I) to (III) above are preferably within the below-described ranges.

(A) Resin sheet having a thickness of 30 μm
ΔL*: 3 or less, Δa*: 1 or less, Δb*: 1 or less
The resin sheet satisfying all the above-described numerical ranges particularly has good color tones.

Regarding the resin sheet having a thickness of 30 μm: the value of ΔL* is preferably 2.9 or less, and more preferably 2.8 or less; the value of Δa* is preferably 0.2 or less, and more preferably 0.1 or less; and the value of Δb* is preferably 0.7 or less, and more preferably 0.5 or less.

(B) Resin sheet having a thickness of 100 μm
ΔL*: 10 or less, Δa*: 1 or less, Δb*: 1 or less
The resin sheet satisfying all the above-described numerical ranges particularly has good color tones.

Regarding the resin sheet having a thickness of 100 μm: the value of ΔL is preferably 9.0 or less, and more preferably 8.5 or less; the value of Δa* is preferably 0.7 or less, and more preferably 0.5 or less; and the value of Δb* is preferably 0.9 or less, and more preferably 0.8 or less.

Moreover, the resin sheet for cards satisfying these numerical ranges of the parameters regarding color tones is excellent in hue balance (color balance) and has natural outer appearance without unnatural conditions such as that in which a specific hue is dark.

Regarding the resin sheet for cards, the OD value (the value of optical density) in accordance with ISO 5-4 is preferably 1.55 or more. The resin sheet for cards satisfying the numerical range is excellent in laser marking properties (color developing properties).

The above-described color tone and OD value vary to some extent depending on the thickness of the resin sheet for cards. Accordingly, the reference values of the above-described parameters may be adjusted depending on the thickness of the resin sheet for cards.

For example, in the case of the resin sheet for cards having a thickness of 30 nm, the OD value is preferably 1.64 or more, and more preferably 1.66 or more.

Further, in the case of the resin sheet for cards having a thickness of 100 μm, the OD value is preferably 1.90 or more, and more preferably 1.92 or more.

The thickness of the resin sheet for cards is preferably 20 to 120 μm, and more preferably 30 to 100 μm.

[Card Comprising Resin Sheet for Cards]

The resin sheet for cards of the present invention forms, for example, one layer included in a card that is a multilayer sheet in which two or more layers are laminated. Examples of the card of the present invention which includes the resin sheet for cards of the present invention and has a multilayer sheet structure as described above include a security card or ID card which comprises the resin sheet for cards of the present invention. Specific examples of the card of the present invention include a card having a multilayer structure, wherein: a film or sheet for transparent surface layers excellent in transparency and durability is the outermost layer; the resin sheet for cards of the present invention is arranged at a position inner than that of the outermost layer; and a white core film or sheet in which an IC chip/antenna, etc. are embedded is arranged at a position inner than that of the resin sheet for cards. Note that the outermost layer and the white core film or sheet as the core layer of the card having a multilayer sheet structure such as the security card and the ID card can also be produced using a thermoplastic resin such as a polycarbonate resin.

Specific examples of the resin sheet for cards having a multilayer sheet structure include an ID card 10 shown in FIG. 1. The ID card 10 is a laminate comprising a first surface layer 12, a second surface layer 14, a first laser marking layer 16, a second laser marking layer 18, a first core layer 20 and a second core layer 22.

The first surface layer 12 and the second surface layer 14 are colorless and transparent, and on the first laser marking layer 16 and the second laser marking layer 18, it is possible to provide printing by means of irradiation of a laser light L. The first core layer 20 and the second core layer 22 are white because the white pigment is contained therein, and in the first core layer 20, an antenna chip 24 is embedded. The information of an IC chip (not shown) is overwritten in response to an electromagnetic wave from outside received by the antenna chip 24.

As described above, the resin composition for cards of the present invention is suitably used, in particular, for the production of the first laser marking layer 16 and the second laser marking layer 18.

In the card having a multilayer structure, a single resin sheet for cards may be used, and alternatively, a plurality of resin sheets for cards may be layered. From the viewpoint of simplification of the card structure and the production process, it is preferred to employ a single resin sheet for cards. Further, by employing a single resin sheet for cards in the card, laser marking performance can be easily controlled.

EXAMPLES

Hereinafter, the present invention will be described in more detail by way of examples. However, the present invention is not limited to the below-described examples, and can be arbitrarily changed and then carried out without departing from the gist of the present invention.

<Absorption Rate A>

The light absorption rate A (%) of the resin composition for cards was calculated as described below. Firstly, the transmittance T (%) and the reflectance R (%) of the resin composition for cards were measured in accordance with JIS Z 8722. Specifically, using test pieces having a thickness of 1 mm of Examples and Comparative Examples described later, the spectral transmittance in a wavelength range of 280 nm to 1300 nm and the spectral reflectance in the above-described wavelength range of 280 nm to 1300 nm were measured with a spectrophotometer U-4100 (using an integrating sphere) manufactured by Hitachi High-Technologies Corporation. Further, the absorption rate A (%) at a wavelength of 1064 nm was calculated as [Absorption rate $A_{1064\ nm}$=100−(Transmittance $T_{1064\ nm}$+Reflectance R$_{1064\ nm}$)], and based on numerical values of the absorption rate A (%) obtained by calculation, evaluation was made as described below.

Absorption rate A:
10% or more: good
Less than 10%: poor

<Color Tone Difference of Laminate>

The measurement was carried out using a spectroscopic colorimeter SD6000 manufactured by Nippon Denshoku Industries Co., Ltd. Firstly, by employing illuminant C and with a 2-degree field of view, reflected colors (L*a*b*) obtained when light was incident on a transparent surface layer side of each of a laminate sample including the resin sheet of Examples and Comparative Examples described later (first laminate) and a reference laminate sample (second laminate) were measured with the above-described spectroscopic colorimeter SD6000. Further, the color tone difference between the first laminate and the second laminate as the reference was evaluated as described below based on the numerical values calculated from formulae (I) to (III) below.

(A) Resin sheet having a thickness of 30 μm $$\Delta L^*\text{:3 or less, } \Delta a^*\text{:1 or less, } \Delta b^*\text{:1 or less}$$

A resin sheet satisfying all the above-described numerical ranges was evaluated as good, and a resin sheet not satisfying any one of the numerical ranges was evaluated as poor.

(B) Resin sheet having a thickness of 100 μm $$\Delta L^*\text{:10 or less, } \Delta a^*\text{:1 or less, } \Delta b^*\text{:1 or less}$$

A resin sheet satisfying all the above-described numerical ranges was evaluated as good, and a resin sheet not satisfying any one of the numerical ranges was evaluated as poor.

Note that the reason why the color tone of the resin sheet of Examples and Comparative Examples was not directly evaluated but evaluation was indirectly carried out based on the color tone difference between the first laminate including the resin sheet and the second laminate not including the resin sheet as described above is that it was difficult to directly evaluate the color tone because the resin sheet of Examples and Comparative Examples was thin.

Therefore, a transparent polycarbonate (PC) film (thickness: 100 μm) was layered on one surface of the resin sheet of Examples and Comparative Examples (thickness: 30 to 100 μm), and a white PC film (thickness: 200 μm) was layered on the other surface of the resin sheet to produce a sample as the first laminate. Next, the above-described transparent PC film (thickness: 100 μm) and the above-described white PC film (thickness: 200 μm) were directly layered without the resin sheet to produce a sample as the second laminate.

Further, as described above, the color tone values (L*, a*, b*) of the first laminate that includes the resin sheet of Examples and Comparative Examples and the color tone values (L*$_{Ref}$, a*$_{Ref}$, b*$_{Ref}$) of the second laminate as the reference that does not include the resin sheet were measured in accordance with JIS Z 8781, and the color tone difference was calculated according to formulae (I) to (III) above (see "Color tone difference of laminate" in Tables 3 and 4).

[Transparent Resin Sheet]

The transparent resin sheet contains a thermoplastic resin as the main component. Specifically, for example, 90/% by mass or more, and preferably 95% by mass or more of the transparent resin sheet is formed with the thermoplastic resin.

As the thermoplastic resin which can substantially constitute the transparent resin sheet, any resin selected from among the above-described polycarbonate, the above-described polyester, etc., or a mixture of a plurality of resins is used. Preferably, as the thermoplastic resin of the transparent resin sheet, polycarbonate is used.

In the present specification, the "transparent resin sheet" refers to a layer (sheet), wherein the total light transmittance of visible light measured in accordance with ISO-13468-1 is 50% or more.

The transparent resin sheet actually used in Examples and Comparative Examples is formed with a polycarbonate resin (aromatic PC resin: "Iupilon (registered trademark) E-2000N" manufactured by Mitsubishi Engineering-Plastics Corporation), and the above-described transmittance in the case of the thickness of 100 μm is 89.8%.

[White Resin Sheet]

The white resin sheet contains a thermoplastic resin as the main component as in the case of the transparent resin sheet. Specifically, for example, 70% by mass or more, and preferably 85% by mass or more of the white resin sheet is formed with the thermoplastic resin.

As the thermoplastic resin which can substantially constitute the white resin sheet as above, any resin selected from among the above-described polycarbonate and the above-described polyester, or a mixture of a plurality of resins is used.

Further, the white resin sheet is colored with a pigment or the like, and for example, a white pigment may be further contained therein. The white resin sheet containing the white pigment is suitably used, for example, as a material for a white sheet for forming a core layer including an antenna of an ID card or the like. As the white pigment, titanium oxide, talc, kaolin, clay, mica or the like is used, and titanium oxide is preferably used.

The content of the white pigment is 10 to 30% by mass, preferably 13 to 25% by mass, and more preferably 15 to 20% by mass based on the mass of the whole white resin sheet.

In the present specification, the "white resin sheet" refers to a layer (sheet), wherein the total light transmittance of visible light measured in accordance with ISO-13468-1 is less than 50%.

The white resin sheet actually used in Examples and Comparative Examples is formed with a resin composition obtained by adding titanium oxide ("White DCF-T-17007" manufactured by Resino Color Industry Co., Ltd.) to a polycarbonate resin (aromatic PC resin: "Iupilon (registered trademark) E-2000N" manufactured by Mitsubishi Engineering-Plastics Corporation) so that the amount of titanium oxide in the whole resin composition became 15% by mass, and the above-described transmittance in the case of the thickness of 200 μm is 5.4%.

<OD Value (Value of Optical Density)>

The maximum OD value of the resin sheet of Examples and Comparative Examples was measured using Spectral density meter 504 manufactured by X-Rite Inc. Specifically, an Nd:YVO$_4$ laser (PL-E Air 10 manufactured by ROFIN-BAASEL Japan Corporation) was irradiated from the transparent surface layer (transparent PC film) side of the first laminate sample and a 3.6×3.6 mm black square was printed under conditions of a scan speed: 1,000 mm/s, an input current: at 1 A intervals in the range of 21.0 to 30.0 A, and a frequency: at 10 kHz intervals in the range of 10 to 100 kHz, and with respect to the printed portion, the OD value was measured using the above-described Spectral density meter 504. Regarding the highest OD value of each sample of the first laminate, evaluation was made as described below.

(A) Resin sheet having a thickness of 30 μm

OD value: 1.64 or more: good, less than 1.64: poor (B) Resin sheet having a thickness of 100 μm OD value: 1.90 or more: good, less than 1.90: poor <Production of Laminate Sample>

A laminate sample to be evaluated with respect to the above-described color tones and OD value regarding the maximum color development was produced. Firstly, the production of a laser marking film arranged in the center of the laminate will be described below.

Production Examples 1-4

Master batches for forming various types of laser marking films were produced.

Specifically, a polycarbonate resin (aromatic PC resin: "Iupilon (registered trademark) E-2000F" manufactured by Mitsubishi Engineering-Plastics Corporation), one of carbon blacks with different primary particle diameters, and a phosphorus-based antioxidant (phosphorus-based antioxidant: "AS2112" manufactured by ADEKA Corporation) were blended using a tumbler so that the composition shown in Table 1 was obtained, and it was put into a twin screw extruder (manufactured by The Japan Steel Works, Ltd., TEX30α) from the base portion thereof to be melt-kneaded at a cylinder temperature of 300° C., thereby producing master batches of Production Examples 1-4 (MB1 to MB4).

Example 1

Next, relative to a polycarbonate resin (aromatic PC resin: "Iupilon (registered trademark) E-2000N" manufactured by Mitsubishi Engineering-Plastics Corporation), 3% by mass of the master batch of Production Example 2 (MB2) and 0.03% of the above-described phosphorus-based antioxidant ("AS2112" manufactured by ADEKA Corporation) were blended and mixed using a tumbler. In the resin composition of Example 1 thus obtained, 30 mass ppm of carbon black and 0.03% by mass of the phosphorus-based antioxidant were contained as components other than the polycarbonate resin.

Using the resin composition of Example 1 as a material, a test piece having a width of 100 mm, a length of 100 mm and a thickness of 1 mm was formed by an injection molding machine (manufactured by Sodick Co., Ltd., PE100) under conditions of a mold temperature: 130° C. and a resin temperature: 330 to 340° C. Thus the test piece of Example 1 was produced.

Example 2

Next, the type of the master batch to be used was changed from that of Example 1 to produce a test piece of Example 2 in which the particle diameter of carbon black is different from that of Example 1.

Comparative Examples 1-10

At least one of the type of the master batch to be used, as in the case of Example 2, and the amount thereof was changed from that of Example 1 to produce test pieces of Comparative Examples 1-10.

The measurement results of the absorption rate, etc. of Examples and Comparative Examples are shown in Table 2.

TABLE 1

| | Components | Primary particle diameter | Production Example 1 MB1 | Production Example 2 MB2 | Production Example 3 MB3 | Production Example 4 MB4 |
|---|---|---|---|---|---|---|
| Thermoplastic resin | Polycarbonate resin E-2000F | | 99.87 | 99.87 | 99.87 | 99.87 |
| Laser coloring agent | Carbon black 1 (% by mass) MONARCH 800 manufactured by Cabot Corporation | 28 nm | 0.1 | | | |
| | Carbon black 2 (% by mass) MONARCH 280 manufactured by Cabot Corporation | 49 nm | | 0.1 | | |
| | Carbon black 3 (% by mass) MONARCH 120 manufactured by Cabot Corporation | 72 nm | | | 0.1 | |
| | Carbon black 4 (% by mass) LAMP BLACK 101 manufactured by Orion Engineered Carbons KK | 104 nm | | | | 0.1 |
| Antioxidant | Phosphorus-based antioxidant (% by mass) | | 0.03 | 0.03 | 0.03 | 0.03 |

TABLE 2

| Components | | Example 1 | Example 2 | Comparative Example 1 | Comparative Example 2 | Comparative Example 3 | Comparative Example 4 |
|---|---|---|---|---|---|---|---|
| Thermoplastic resin | Polycarbonate resin E-2000N % by mass | 96.97 | 96.97 | 98.97 | 96.97 | 94.97 | 98.97 |
| Laser coloring agent | MB 1 % by mass (CB in composition: mass ppm) | | | 1.0 (10) | 3.0 (30) | 5.0 (50) | |
| | MB 2 % by mass (CB in composition: mass ppm) | 3.0 (30) | | | | | 1.0 (10) |
| | MB 3 % by mass (CB in composition: mass ppm) | | 3.0 (30) | | | | |
| | MB 4 % by mass (CB in composition: mass ppm) | | | | | | |
| Antioxidant | Phosphorus-based antioxidant (% by mass) | 0.03 | 0.03 | 0.03 | 0.03 | 0.03 | 0.03 |
| Sheet thickness [μm] | | 1000 | 1000 | 1000 | 1000 | 1000 | 1000 |
| CB concentration [ppm] | | 30 | 30 | 10 | 30 | 50 | 10 |
| Transmittance $T_{1064\ nm}$ [%] | | 71.90 | 73.87 | 65.94 | 74.72 | 65.29 | 85.18 |
| Reflectance $R_{1064\ nm}$ [%] | | 8.31 | 8.39 | 9.10 | 8.21 | 7.56 | 8.95 |
| Absorption rate $A_{1064\ nm}$ [%] | Calculated value | 19.79 | 17.74 | 4.96 | 17.07 | 27.15 | 5.87 |
| | Evaluation | Good | Good | Poor | Good | Good | Poor |

| Components | | Comparative Example 5 | Comparative Example 6 | Comparative Example 7 | Comparative Example 8 | Comparative Example 9 | Comparative Example 10 |
|---|---|---|---|---|---|---|---|
| Thermoplastic resin | Polycarbonate resin E-2000N % by mass | 94.97 | 98.97 | 94.97 | 98.97 | 96.97 | 94.97 |
| Laser coloring agent | MB 1 % by mass (CB in composition: mass ppm) | | | | | | |
| | MB 2 % by mass (CB in composition: mass ppm) | 5.0 (50) | | | | | |
| | MB 3 % by mass (CB in composition: mass ppm) | | 1.0 (10) | 5.0 (50) | | | |
| | MB 4 % by mass (CB in composition: mass ppm) | | | | 1.0 (10) | 3.0 (30) | 5.0 (50) |
| Antioxidant | Phosphorus-based antioxidant (% by mass) | 0.03 | 0.03 | 0.03 | 0.03 | 0.03 | 0.03 |
| Sheet thickness [μm] | | 1000 | 1000 | 1000 | 1000 | 1000 | 1000 |
| CB concentration [ppm] | | 50 | 10 | 50 | 10 | 30 | 50 |
| Transmittance $T_{1064\ nm}$ [%] | | 61.60 | 84.95 | 61.29 | 86.45 | 74.72 | 68.22 |
| Reflectance $R_{1064\ nm}$ [%] | | 7.40 | 8.89 | 7.46 | 9.00 | 8.21 | 8.00 |
| Absorption rate $A_{1064\ nm}$ [%] | Calculated value | 31.00 | 6.16 | 31.25 | 4.55 | 17.07 | 23.78 |
| | Evaluation | Good | Poor | Good | Poor | Good | Good |

Example 3

Next, relative to a polycarbonate resin (aromatic PC resin: "lupilon (registered trademark) E-2000N" manufactured by Mitsubishi Engineering-Plastics Corporation), 3% by mass of the master batch of Production Example 2 (MB2) and 0.03% of the above-described phosphorus-based antioxidant ("AS2112" manufactured by ADEKA Corporation) were blended and mixed using a tumbler. In the resin composition of Example 3 thus obtained, 30 mass ppm of carbon black and 0.03% by mass of the phosphorus-based antioxidant were contained as components other than the polycarbonate resin.

Using the resin composition of Example 3 as a material, a sheet having a thickness of 100 μm was formed by a T-die melt extruder composed of a twin screw extruder with a barrel diameter of 32 mm and screw L/D=31.5 at a discharge rate of 20 kg/hour and at a screw rotation speed of 200 rpm. In this regard, the cylinder/die head temperature was set at 300° C. Thus the laser marking film of Example 3 was produced.

Examples 4-6

Next, at least one of the type of the master batch to be used and the thickness thereof was changed from that of Example 3 to produce laser marking films of Examples 4-6 in which at least one of the particle diameter of carbon black and the thickness was different from that of Example 3.

Comparative Examples 11-30

At least one of the type of the master batch to be used and the thickness thereof was changed from that of Example 3 as in the case of Examples 4-6 to produce laser marking films of Comparative Examples 11-30.

A transparent polycarbonate film having a thickness of 100 μm was layered on one surface of each of the laser marking films of Examples and Comparative Examples thus produced, and a white polycarbonate film having a thickness of 200 μm was layered on the other surface thereof, thereby producing laminate samples. The color tone difference and the OD value of each of the laminate samples of Examples and Comparative Examples were measured. The measurement results are shown below.

Note that Table 3 shows the results of Examples and Comparative Examples in which the laser marking film having a thickness of 100 μm was used, and Table 4 shows the results of Examples and Comparative Examples in which the laser marking film having a thickness of 30 μm was used.

TABLE 3

| | Components | Example 3 | Example 4 | Comparative Example 11 | Comparative Example 12 | Comparative Example 13 | Comparative Example 14 |
|---|---|---|---|---|---|---|---|
| Thermoplastic resin | Polycarbonate resin E-2000N % by mass | 96.97 | 96.97 | 98.97 | 96.97 | 94.97 | 98.97 |
| Laser coloring agent | MB 1 % by mass (CB in composition: mass ppm) | | | 1.0 (10) | 3.0 (30) | 5.0 (50) | |
| | MB 2 % by mass (CB in composition: mass ppm) | 3.0 (30) | | | | | 1.0 (10) |
| | MB 3 % by mass (CB in composition: mass ppm) | | 3.0 (30) | | | | |
| | MB 4 % by mass (CB in composition: mass ppm) | | | | | | |
| Antioxidant | Phosphorus-based antioxidant (% by mass) | 0.03 | 0.03 | 0.03 | 0.03 | 0.03 | 0.03 |
| Sheet thickness [μm] | | 100 | 100 | 100 | 100 | 100 | 100 |
| CB concentration [ppm] | | 30 | 30 | 10 | 30 | 50 | 10 |
| Color tone difference of laminate | ΔL* | 7.93 | 8.45 | 5.49 | 9.67 | 14.26 | 4.42 |
| | Δa* | 0.31 | 0.32 | 0.15 | 0.36 | 0.60 | 0.16 |
| | Δb* | 0.45 | 0.43 | 1.48 | 2.93 | 4.02 | 0.17 |
| | Evaluation | Good | Good | Poor | Poor | Poor | Good |
| Color developing properties | OD value | 1.97 | 1.92 | 1.92 | 1.96 | 1.85 | 1.80 |
| | Evaluation | Good | Good | Good | Good | Poor | Poor |

| | Components | Comparative Example 15 | Comparative Example 16 | Comparative Example 17 | Comparative Example 18 | Comparative Example 19 | Comparative Example 20 |
|---|---|---|---|---|---|---|---|
| Thermoplastic resin | Polycarbonate resin E-2000N % by mass | 94.97 | 98.97 | 94.97 | 98.97 | 96.97 | 94.97 |
| Laser coloring agent | MB 1 % by mass (CB in composition: mass ppm) | | | | | | |
| | MB 2 % by mass (CB in composition: mass ppm) | 5.0 (50) | | | | | |
| | MR 3 % by mass (CB in composition: mass ppm) | | 1.0 (10) | 5.0 (50) | | | |
| | MB 4 % by mass (CB in composition: mass ppm) | | | | 1.0 (10) | 3.0 (30) | 5.0 (50) |
| Antioxidant | Phosphorus-based antioxidant (% by mass) | 0.03 | 0.03 | 0.03 | 0.03 | 0.03 | 0.03 |
| Sheet thickness [μm] | | 100 | 100 | 100 | 100 | 100 | 100 |
| CB concentration [ppm] | | 50 | 10 | 50 | 10 | 30 | 50 |
| Color tone difference of laminate | ΔL* | 11.13 | 5.14 | 11.43 | 3.25 | 4.76 | 7.20 |
| | Δa* | 0.44 | 0.15 | 0.42 | 0.07 | 0.12 | 0.15 |
| | Δb* | 0.75 | 0.16 | 0.61 | 0.26 | 0.25 | 0.28 |
| | Evaluation | Poor | Good | Poor | Good | Good | Good |
| Color developing properties | OD value | 1.98 | 1.83 | 1.95 | 1.00 | 1.70 | 1.88 |
| | Evaluation | Good | Poor | Good | Poor | Poor | Poor |

TABLE 4

| Components | | Example 5 | Example 6 | Comparative Example 21 | Comparative Example 22 | Comparative Example 23 | Comparative Example 24 |
|---|---|---|---|---|---|---|---|
| Thermoplastic resin | Polycarbonate resin E-2000N % by mass | 96.97 | 96.97 | 98.97 | 96.97 | 94.97 | 98.97 |
| Laser coloring agent | MB 1 % by mass (CB in composition: mass ppm) | | | 1.0 (10) | 3.0 (30) | 5.0 (50) | |
| | MB 2 % by mass (CB in composition: mass ppm) | 3.0 (30) | | | | | 1.0 (10) |
| | MB 3 % by mass (CB in composition: mass ppm) | | 3.0 (30) | | | | |
| | MB 4 % by mass (CB in composition: mass ppm) | | | | | | |
| Antioxidant | Phosphorus-based antioxidant (% by mass) | 0.03 | 0.03 | 0.03 | 0.03 | 0.03 | 0.03 |
| Sheet thickness [μm] | | 30 | 30 | 30 | 30 | 30 | 30 |
| CB concentration [ppm] | | 30 | 30 | 10 | 30 | 50 | 10 |
| Color tone difference of laminate | ΔL* | 2.77 | 2.61 | 2.03 | 3.28 | 5.13 | 1.20 |
| | Δa* | 0.05 | 0.03 | 0.04 | 0.04 | 0.13 | 0.02 |
| | Δb* | 0.30 | 0.31 | 0.78 | 1.46 | 2.08 | 0.18 |
| | Evaluation | Good | Good | Good | Poor | Poor | Good |
| Color developing properties | CD value | 1.67 | 1.66 | 1.54 | 1.55 | 1.59 | 1.48 |
| | Evaluation | Good | Good | Poor | Good | Good | Poor |

| Components | | Comparative Exemple 25 | Comparative Example 26 | Comparative Example 27 | Comparative Example 28 | Comparative Example 29 | Comparative Example 30 |
|---|---|---|---|---|---|---|---|
| Thermoplastic resin | Polycarbonate resin E-2000N % by mass | 94.97 | 98.97 | 94.97 | 98.97 | 96.97 | 94.97 |
| Laser coloring agent | MB 1 % by mass (CB in composition: mass ppm) | | | | | | |
| | MB 2 % by mass (CB in composition: mass ppm) | 5.0 (50) | | | | | |
| | MB 3 % by mass (CB in composition: mass ppm) | | 1.0 (10) | 5.0 (50) | | | |
| | MB 4 % by mass (CB in composition: mass ppm) | | | | 1.0 (10) | 3.0 (30) | 5.0 (50) |
| Antioxidant | Phosphorus-based antioxidant (% by mass) | 0.03 | 0.03 | 0.03 | 0.03 | 0.03 | 0.03 |
| Sheet thickness [μm] | | 30 | 30 | 30 | 30 | 30 | 30 |
| CB concentration [ppm] | | 50 | 10 | 50 | 10 | 30 | 50 |
| Color tone difference of laminate | ΔL* | 3.84 | 1.00 | 3.94 | 0.85 | 1.38 | 2.08 |
| | Δa* | 0.09 | 0.02 | 0.09 | 0.09 | 0.06 | 0.01 |
| | Δb* | 0.49 | 0.15 | 0.34 | 0.01 | 0.10 | 0.01 |
| | Evaluation | Poor | Good | Poor | Good | Good | Good |
| Color developing properties | CD value | 1.65 | 1.63 | 1.61 | 1.26 | 1.33 | 1.53 |
| | Evaluation | Good | Poor | Good | Poor | Poor | Poor |

EXPLANATIONS OF LETTERS OR NUMERALS

10 ID card (multilayer sheet)
12 first surface layer
14 second surface layer
16 first laser marking layer
18 second laser marking layer
20 first core layer
22 second core layer
24 antenna chip

The invention claimed is:

1. A resin composition for cards containing a laser coloring agent and a thermoplastic resin, wherein:

the thermoplastic resin contains a polycarbonate resin; and the laser coloring agent contains at least one black pigment, the primary particle diameter of the black pigment being 40 to 80 nm, and the amount of the black pigment being 20 to 40 mass ppm based on the mass of the whole resin composition for cards, wherein when the light transmittance of the resin composition for cards with a thickness of 1 mm at a wavelength of 1064 nm is referred to as T % and the light reflectance of the resin composition for cards with a thickness of 1 mm at a wavelength of 1064 nm is referred to as R %, a value of the light absorption rate A % at a wavelength of 1064 nm defined by formula (a) below is 10% or more:

$$100-(T(\%)+R(\%))=A(\%) \tag{a}$$

2. The resin composition for cards according to claim 1, wherein the light absorption rate A % is 12% or more.

3. A resin sheet for cards containing the resin composition for cards according to claim 1.

4. The resin sheet for cards according to claim 3, wherein: the value of the color tone difference $\Delta L^*$ defined by formula (I) below is 10 or less; the value of the color tone difference $\Delta a^*$ defined by formula (II) below is 1 or less; and the value of the color tone difference $\Delta b^*$ defined by formula (III) below is 1 or less $$\Delta L^* = |L^*_{Ref} - L^*| \tag{I}$$

$$\Delta a^* = |a^*_{Ref} - a^*| \tag{II}$$

$$\Delta b^* = |b^*_{Ref} - b^*| \tag{II}$$

wherein color tone values ($L^*$, $a^*$, $b^*$) in formulae (I), (II) and (III) above show color tones of reflected colors obtained when light is incident on a transparent resin sheet side of a first laminate in which a transparent resin sheet is layered on one surface of the resin sheet for cards and a white resin sheet is layered on the other surface thereof, and wherein color tone values ($L^*_{Ref}$, $a^*_{Ref}$, $b^*_{Ref}$) in formulae (I), (II) and (III) above show color tones of reflected colors obtained when light is incident on a transparent resin sheet side of a second laminate in which the transparent resin sheet and the white resin sheet are layered and the layer of the resin sheet for cards is not included.

5. The resin sheet for cards according to claim 3, wherein the OD value in accordance with ISO 5-4 is 1.55 or more.

6. The resin sheet for cards according to claim 3, which has a thickness of 20 to 120 μm.

7. A security card or ID card which comprises the resin sheet for cards according to claim 3.

* * * * *